(12) United States Patent
Oyaski

(10) Patent No.: US 7,084,570 B2
(45) Date of Patent: Aug. 1, 2006

(54) REMOTE CONTROL OF VEHICLE LIGHTING

(76) Inventor: Michael F. Oyaski, 207 E. Highland Ave., Ebensburg, PA (US) 15931

(*) Notice: Subject to any disclaimer, the term of this patent is extended or adjusted under 35 U.S.C. 154(b) by 93 days.

(21) Appl. No.: 10/839,195

(22) Filed: May 5, 2004

(65) Prior Publication Data

US 2005/0248283 A1    Nov. 10, 2005

(51) Int. Cl.
*B60Q 1/02* (2006.01)

(52) U.S. Cl. .................... 315/82; 315/77; 307/10.8; 340/825.69; 340/825.72; 362/507

(58) Field of Classification Search ............ 315/82, 315/83, 77; 307/10.1, 10.8; 362/465–467, 362/475, 487, 488, 498, 507, 508, 527, 529, 362/544; 340/854.3, 854.6, 855.1, 855.4, 340/825.69, 825.72
See application file for complete search history.

(56) References Cited

U.S. PATENT DOCUMENTS 3,487,358 A * 12/1969 Yasukazu et al. ........... 340/471
3,986,022 A * 10/1976 Hyatt ......................... 250/205
4,227,588 A * 10/1980 Biancardi ................... 180/167
4,459,591 A *  7/1984 Haubner et al. ........ 340/825.57
4,663,626 A *  5/1987 Smith .................... 340/825.69
5,195,813 A *  3/1993 Brown ....................... 362/464
5,906,431 A *  5/1999 Chianale et al. ............ 362/515
6,265,829 B1 * 7/2001 Perdec ......................... 315/82

* cited by examiner

Primary Examiner—Haissa Philogene
(74) Attorney, Agent, or Firm—James Ray & Assoc.

(57) ABSTRACT

A headlight adapter and an interior lighting adapter provide remote control operation of a filament in a headlight and of an interior light of a vehicle, respectively. The remote control of the headlight allows the use of a multifilament headlight which can replace a normal headlight and provide such additional lighting as fog lights and emergency flashing headlights. The remote control interior lighting adapter allows a person approaching a vehicle to turn on an interior light, such as a dome light, without unlocking the doors of the vehicle before entering the vehicle. The headlight adapter, with an additional wire carrying a constant battery voltage to the headlight adapter, provides temporary light from the headlights for security and convenience when a driver is approaching or leaving the vehicle.

14 Claims, 15 Drawing Sheets

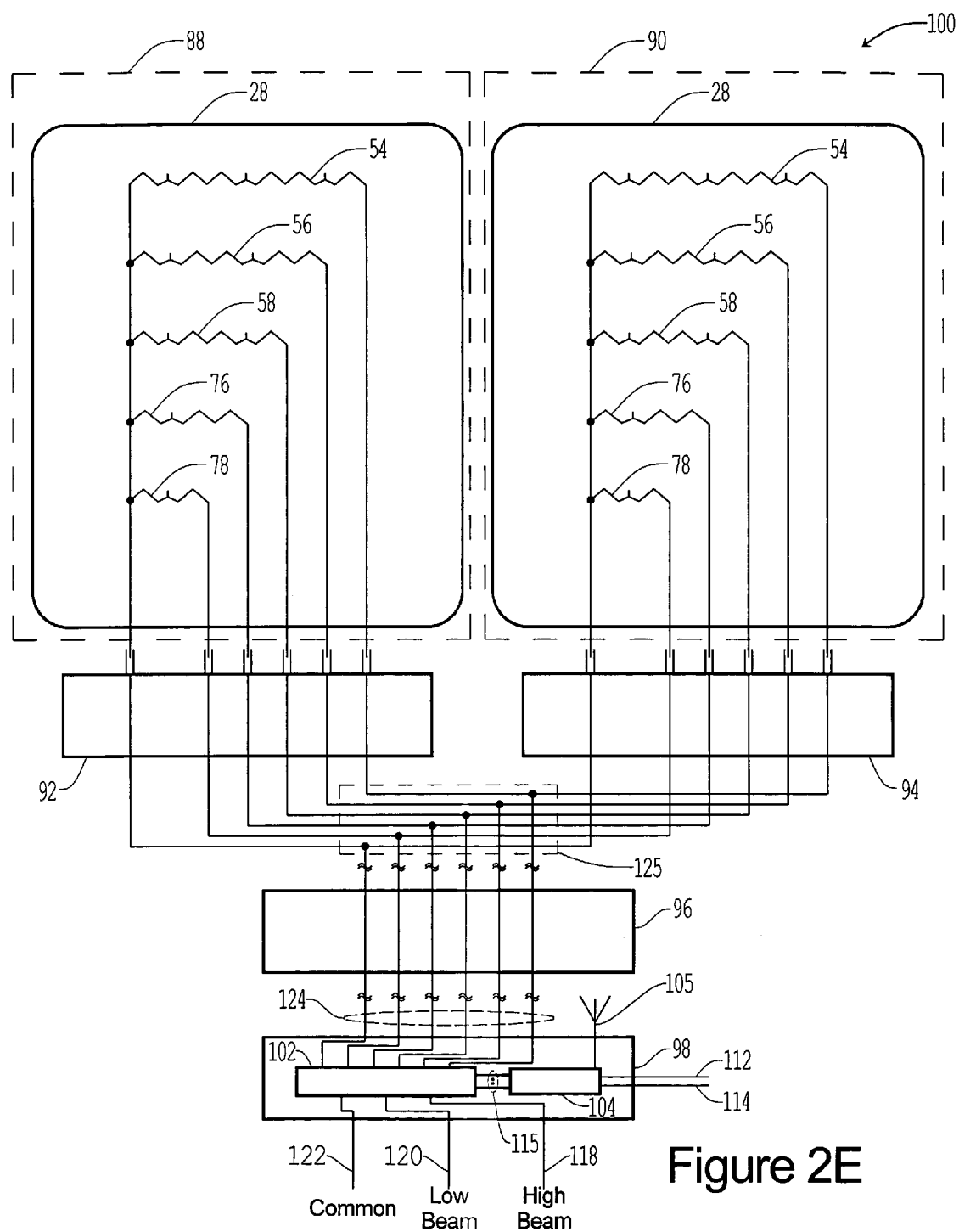

REMOTE CONTROL OF VEHICLE LIGHTING

FIELD OF THE INVENTION

This invention relates to vehicle lighting, both external and internal and, more specifically, to remote control of vehicle lighting.

BACKGROUND OF THE INVENTION

A driver approaching his or her vehicle and seeing one or more unknown persons near the vehicle may have fear for his or her personal safety and for damage to the vehicle. At present many vehicles, especially cars, have remote entry systems which also provide protection of the vehicle and its contents by enabling the vehicle's horn or a siren, and turning on the headlights when a door is opened before the door monitoring system is disabled. Such systems generally have a panic button on the remote control so that a driver approaching the car who is apprehensive can turn on the security system by remote control.

However, a driver with such a remote control may not want to turn on the security system of the car because the noise and lights may disturb innocent bystanders and may draw attention to the car and themselves. Consequently, such a driver may still be apprehensive but reluctant to use the panic button on the remote control.

Some of the more expensive present day vehicles have headlights which stay on for a preselected time after the lights are turned off to assist a person in the vehicle to find his or her way from their vehicles to their destination, such as a residence, and to provide additional security during their walk. However, persons driving other vehicles which do not have the headlight delay feature may want such assistance and additional security when leaving the vehicle.

Similarly, some present day vehicles have fog lights from the factory while others do not. Some people want fog lights but cannot afford the cost and installation fee for adding fog lights. In addition, some people, such as police, fire and medical personnel, would want relatively inexpensive flashing red and blue headlights to alert others that an emergency vehicle is approaching.

Therefore, it can be appreciated that after market equipment which provides some security and comfort to a driver approaching a vehicle without turning on the vehicle's security system is highly desirable. In addition, it can be appreciated that after market equipment which provides a timed delayed headlight feature and which is relatively inexpensive to have installed is desirable. It can also be appreciated that after market equipment which provides fog lights which are relatively inexpensive to have installed is desirable. Similarly, it can be appreciated that after market equipment which is relatively inexpensive to have installed that provides a flashing red and blue colored headlight beam is desirable.

BRIEF SUMMARY OF THE INVENTION

In one aspect the present invention generally provides a vehicle lighting control system having a headlight with a headlight filament section containing a filament. A headlight adapter coupled to the headlight filament section has a first connector configured to connect to a second connector attached to the vehicle's wiring harness. The headlight adapter additionally has a current enabling device coupled between the headlight filament section and the second connector such that the enabling of the current enabling device illuminates the filament when a voltage within a predetermined voltage range is applied to a receiver in the headlight adapter. The receiver is coupled to the current enabling device for receiving a control signal and enabling the current enabling device upon receipt thereof. The vehicle lighting system further includes a transmitter for transmitting the control signal.

In a further aspect the present invention generally provides a method for controlling a vehicle lighting system. A first control signal is transmitted from a transmitter that is received at a first receiver in a headlight adapter, the headlight adapter coupled between a vehicle's wiring harness and a filament in a headlight of the vehicle. Forming a connection or interrupting a connection between the filament and the wiring harness to thereby turn on or turn off, respectively, the filament in said headlight.

In a still further aspect of the present invention generally provides a lighting control system for an interior light of a vehicle. An interior light control adapter unit has an interior lighting adapter for receiving a control signal, a current enabling device wired in parallel with an on and off switch for the interior light of the vehicle and a receiving unit within the interior lighting adapter coupled to the relay for turning on or turning off the relay. The lighting control system also includes a transmitter for transmitting the control signal.

OBJECTS OF THE INVENTION

It is, therefore, one of the primary objects of the present invention to provide a method and apparatus which provides some security and comfort to a driver approaching a vehicle without having to turn on the vehicle's horn or siren.

A further object of the present invention is to provide a method and apparatus which provides some security and comfort to a driver approaching a vehicle without having to unlock the doors of the vehicle.

Another object of the present invention is to provide after market equipment which provides a timed delayed headlight feature which is relatively inexpensive to have installed.

Still another object, of the present invention, is to provide after market fog lights which are relatively inexpensive to have installed.

A further object of the present invention is to provide after market equipment which is relatively inexpensive to have installed and which provides a flashing red and blue colored headlight beam.

In addition to the above-described objects and advantages of the present invention, various other objects and advantages will become more readily apparent to those persons who are skilled in the same and related arts from the following more detailed description on the invention, particularly, when such description is taken in conjunction with the attached drawing, figures, and appended claims.

DESCRIPTION OF THE DRAWING

FIG. 2E is a schematic diagram showing two headlights which can be used in the vehicle of FIG. 1;

Figure 1:
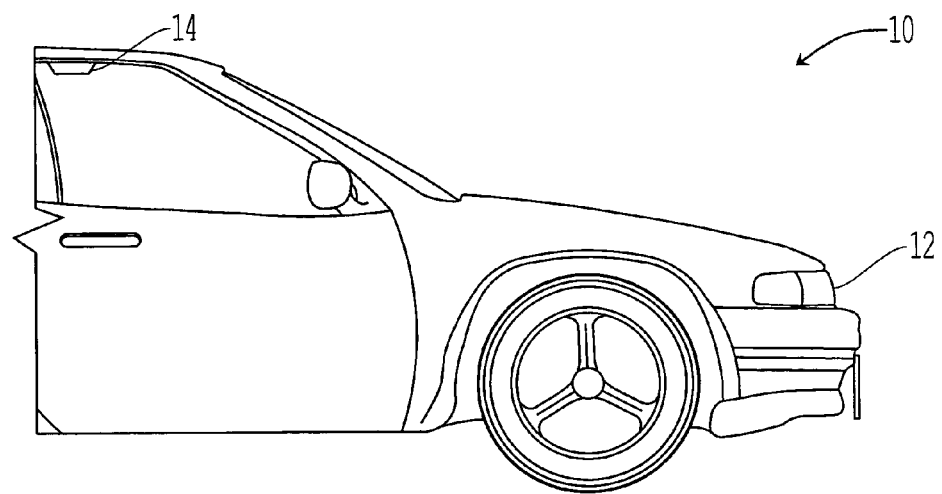
FIG. 1 is a side view of a front section of a vehicle according to the present invention.

It will be appreciated that for purposes of clarity and where deemed appropriate, that the various elements in the drawings have not necessarily been drawn to scale in order to better show the features of the invention.

DETAILED DESCRIPTION OF THE PREFERRED EMBODIMENT

Prior to proceeding to a much more detailed description of the present invention, it should be noted that identical components which have identical functions have been identified with identical reference numerals throughout the several views illustrated in the drawing figures for the sake of clarity and understanding of the invention.

Turning now to the drawing, FIG. 1 shows a side view of a front portion of a vehicle 10. The vehicle has a headlight 12 and an interior light 14 which are controlled, in part, by the lighting control system of the present invention.

Figure 2A:
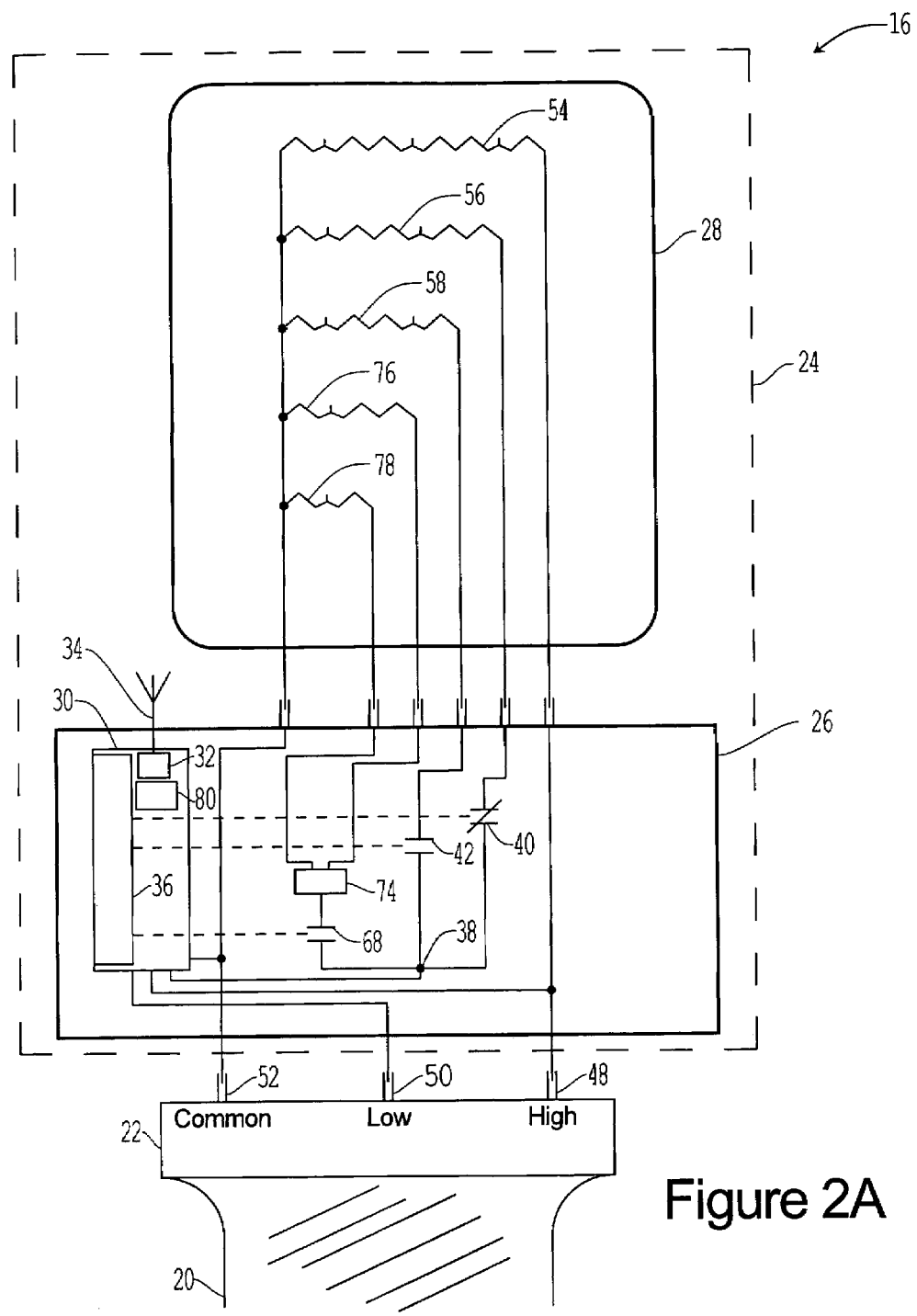
FIG. 2A is a schematic diagram showing a headlight which is used in the vehicle of FIG. 1.

FIG. 2A is a schematic diagram, shown generally as 16, of the presently preferred embodiment of the present invention. Also shown in FIG. 2A is a portion of the vehicle's wiring harness, an electrical cable 20, and attached thereto is one of the vehicle's headlight sockets 22. The easily replaceable portion 24 of the headlight 16 of the present invention is configured to connect to the socket 22 in the same manner as a present day headlight. The easily replaceable portion 24 of the headlight 16 consists of an headlight adapter 26 and a headlight filament section 28. The headlight adapter 26 includes a receiver 30 that contains a RF receiver 32 with an antenna 34 attached thereto. Included in the receiver 30 is a relay controller 36 for controlling three current enabling devices, which, in the presently preferred embodiment, are relays 40, 42 and 68. Relay 40 is a normally closed relay while relays 42 and 68 are normally open relays. The headlight adapter 26 receives the high beam voltage at connection 48 of the socket 22, the low beam voltage at connection 50, and has a common or chassis ground connection 52.

The high beam voltage at connection 48 is connected to an input of the receiver 30 and is passed through the headlight adapter 26 to one end of a first filament 54, the other end of which is coupled to the common connection 52 through the headlight adapter 26. The low beam voltage at connection 50 is connected to an input of the receiver 30. A supply voltage output of the receiver 30 is connected to a node 38 which is also connected to a first contact of relays 40, 42 and 68. The other contact of relay 40 is coupled to one end of a second filament 56, the other end of which is coupled to the common connection 52. The other contact of relay 42 is coupled to one end of a third filament 58, the other end of which is coupled to the common connection 52. The other contact of relay 68 is coupled to the input of a flasher module 74.

The flasher module 74 has two outputs, the first output coupled to a fourth filament 76, the other end of which is coupled to the common connection 52, and the second output of the flasher module 74 is coupled to a fifth filament 78, the other end of which is coupled to the common connection 52. In the presently preferred embodiment filament 54 is a white high beam filament and filaments 56, 58, 76 and 78 are white low beam filaments. The low beam voltage at connection 50 and the high beam voltage at connection 48 are both at battery voltage when energized. The difference between high beam brightness and low beam brightness being the different resistances of the low beam and high beam filaments. Filament 58 is used with a colored lens to provide a fog light color, filament 76 is used with a colored lens to provide a red color and filament 78 is used with a colored lens to provide a blue color.

The filaments 54, 56, 58, 76 and 78 can be of various types such as tungsten, halogen or a strobe light.

The chassis ground at connection 52 is also connected to the receiver 30.

In operation, the high beam voltage at connection 48 is passed directly to the first or high beam filament 54. The voltage at the low beam voltage at connection 50 of the socket 22 is coupled through the receiver 30, then through node 38 and relay 40 to the second or low beam filament 56 when none of the relays 40, 42 or 68 are energized, and thus the high and low beam operates the same, from a driver's point of view, as in present day headlights.

The receiver 30 receives the battery voltage from either the high beam voltage at connection 48 or the low beam voltage at connection 50. The receiver 30, in turn, selectively provides the battery voltage from either connection 48 or 50 to node 38. The receiver 30 operates relays 40, 42 and 68 only when the voltage from the high beam voltage at connection 48 or the low beam voltage at connection 50 is a voltage that is higher than the voltage used for daylight running lights. If the headlights are to provide high beams only (i.e., the battery voltage is applied to filament 54 only and no signal is received at the antenna 34 which would cause any of the other four filaments 56, 58, 76 and 78 to be illuminated), the node 38 would then be at chassis ground. If any of the four filaments 56, 58, 76, and 78 are to have the battery voltage applied to them, then node 38 is at the battery voltage whether the high beam or low beam is selected by the driver.

The flasher module 74 operates when relay 68 is closed. The flasher module 74 causes filaments 76 and 78 to alternately flash on and off. In the presently preferred embodiment the two filaments 76 and 78 are synchronized by the flashing module 74 so that while one filament is on, the other filament is off.

Figure 2B:
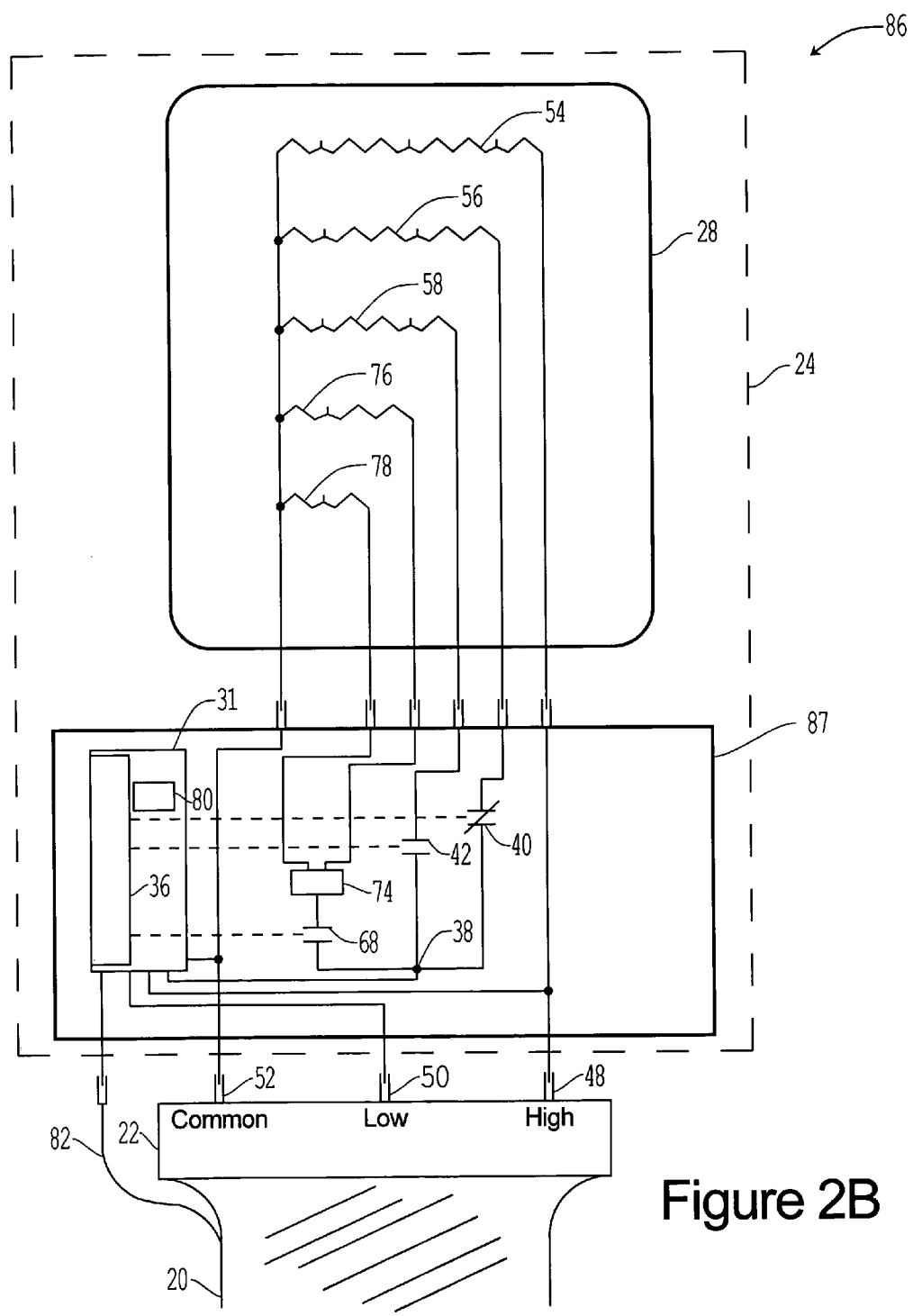
FIG. 2B is a schematic diagram of a second embodiment of the present invention showing a headlight which may be used in the vehicle of FIG. 1.

FIG. 2B shows a headlight 86 that is the headlight 16 of FIG. 2A with an additional signal wire 82 from the electrical cable 20 to a receiver 31 in headlight adapter 87 and with the RF receiver 32 and antenna 34 removed. This embodiment is used when there is a wired connection between the headlight 86 and a remote control unit such as the remote control unit 106 shown in FIG. 9B. The signal wire 82 carries the selection information from the remote control unit 106 which, in FIG. 2A, was transmitted between an antenna 198 of the remote control unit 186 of FIG. 9A and the headlight 16.

Figure 2C:
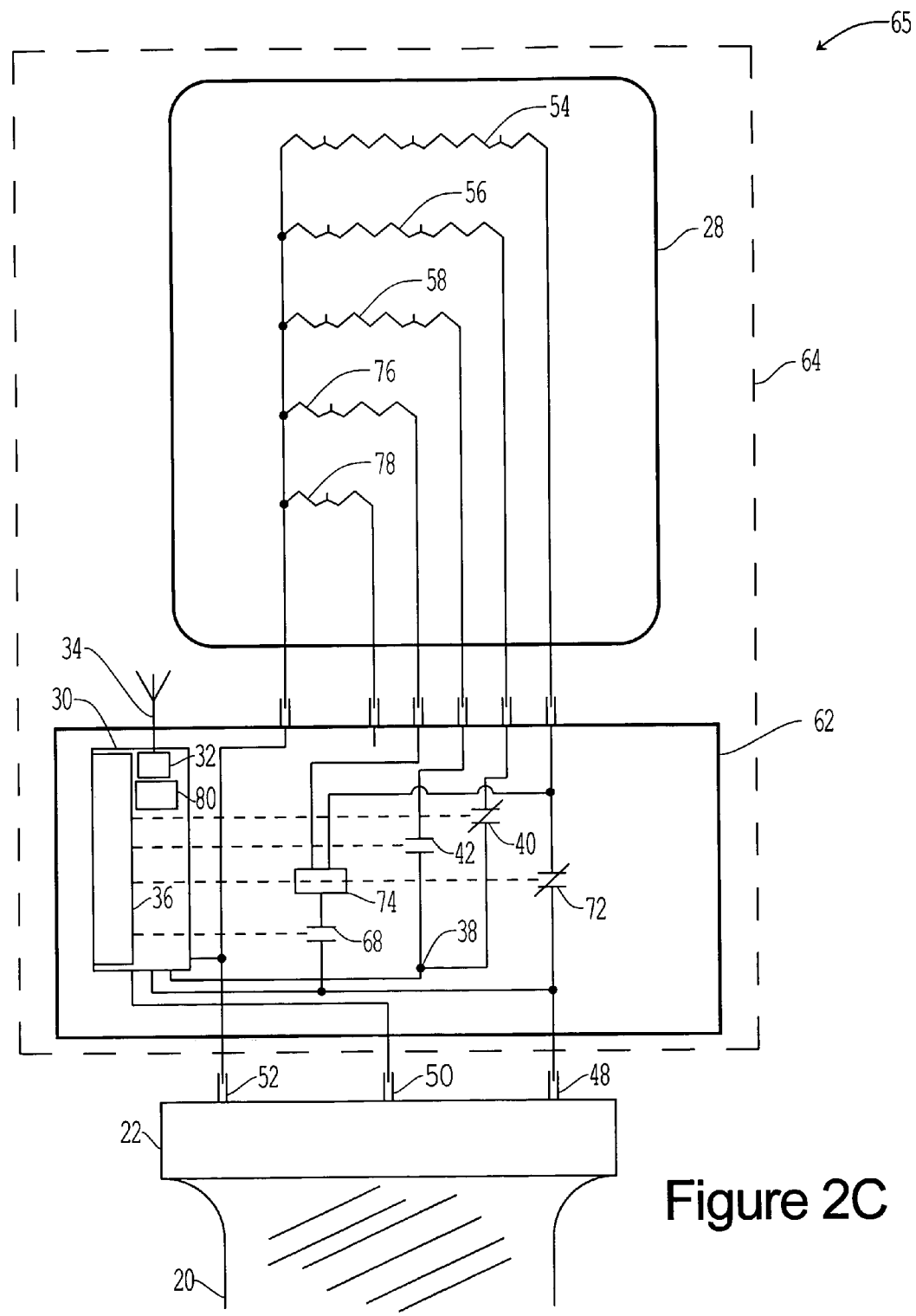
FIG. 2C is a schematic diagram of a variation of FIG. 2A.

FIG. 2C is a schematic diagram of a headlight 65 that is an alternative to the headlight 16 of FIG. 2A that provides a flashing alternating red and white light. FIG. 2C shows the filament section 28 and a headlight adapter 62 that are both contained within an easily replaceable portion 64 of headlight 65. The headlight adapter 62 contains four relays 40, 42, 68 and 72. Normally open relay 68 is connected between the high beam voltage at connection 48 and the input of the flasher module 74. The normally closed relay 72 couples the high beam voltage at connection 48 to the high beam filament 54 when it is closed. Relay 72 is open only when the flasher module 74 is enabled. A first output of the flasher module 74 is coupled to filament 76 that provides a red beam in the headlight 65. A second output of the flasher module 74 is connected at a point between the relay 72 and the filament 54. When a flashing alternating red and white beam is chosen, the relay 72 is opened, and the flasher module 74 receives battery voltage from the high beam voltage at connection 48 through relay 68.

Figure 2D:
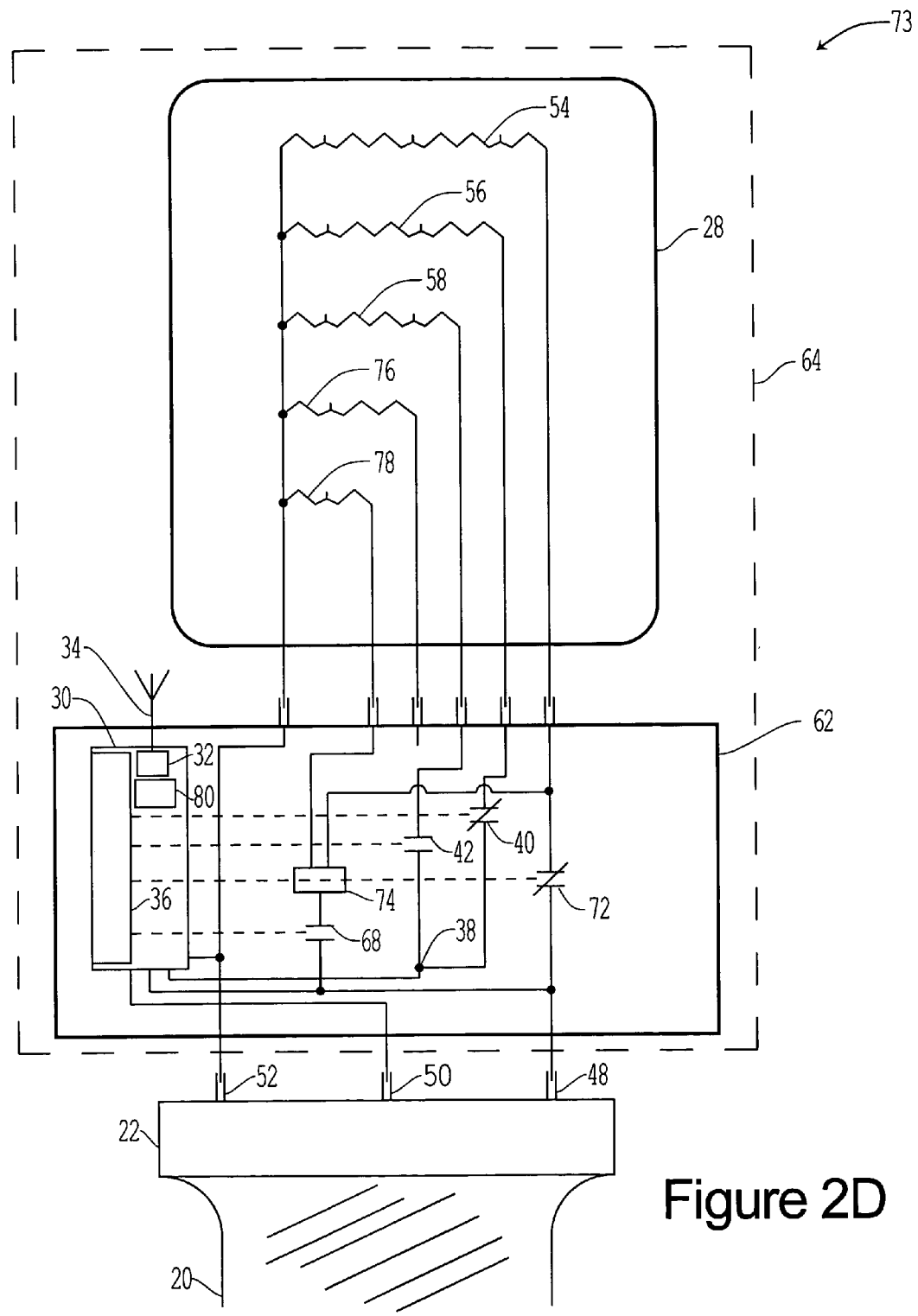
FIG. 2D is a schematic diagram of another variation of FIG. 2A.

FIG. 2D, which shows a headlight 73 is the same as the headlight 16 of FIG. 2C except that the second output of the flasher module 74, contained in the headlight adapter 63 is connected to filament 78 that provides the blue light.

In the embodiments of FIGS. 2C and 2D the white beam is the high beam. However, the headlight adapters 62 of FIGS. 2C and 2D could easily be adapted to provide a low beam white light by connecting relay 68 to node 38 and moving the second output of the flasher module 74 to a point between relay 40 and filament 56.

The term "battery voltage" as used herein means the approximate voltage at the positive terminal of the battery, and includes battery voltages which are less than the battery voltage by, for example, a diode voltage drop.

The receiver 30 and the relay controller 36 in FIGS. 2A, 2C and 2D respond to a plurality of predetermined signals received at the antenna 34. For example, a first predetermined signal might cause relay 42 to close, thus illuminating filament 58. Shown in the table below are various headlight illumination options with their associated predetermined signals, high beam or low beam selection by the driver and the states of the relays 40, 42, 68 and 72.

| Illumination Option | Predetermined Signal | High or Low Beam | Relay 40 | Relay 42 | Relay 68 | Relay 72 | Relay 144 |
|---|---|---|---|---|---|---|---|
| -1- High Beam Only | (none) | High | Open | Open | Open | NA or Closed | NA or Open |
| -2- Low Beam Only | (none) | Low | Closed | Open | Open | NA or Open or Closed | NA or Open or Closed |
| -3- Fog Light only | 1st | Low | Open | Closed | Open | NA or Open or Closed | NA or Open |
| -4- Fog Light with Low Beam | 2nd | Low | Closed | Closed | Open | NA or Open or Closed | AA or Open |
| -5- Alternating Red and Blue Headlight Only | 3rd | High or Low | Open | Open | Closed | NA | NA or Open |
| -6- Alternating Red and Blue Headlight with High Beam | 4th | High | Open | Open | Closed | NA | NA or Open |
| -7- Alternating Red and Blue Headlight with Low Beam | 4th | Low | Closed | Open | Closed | NA | NA or Open |
| -8- Alternating Red and White High Beam | 3rd | High | Open | Open | Closed | Closed | NA or Open |
| -9- Alternating Blue and White High Beam | 3rd | High | Open | Open | Closed | Closed | NA or Openb |

-continued

| Illumination Option | Predetermined Signal | High or Low Beam | Relay 40 | Relay 42 | Relay 68 | Relay 72 | Relay 144 |
|---|---|---|---|---|---|---|---|
| -10- Headlight off Portable Remote Control Transmitting | 5th | NA | Open | Opn | Open | NA | Closed |

Figure 3:
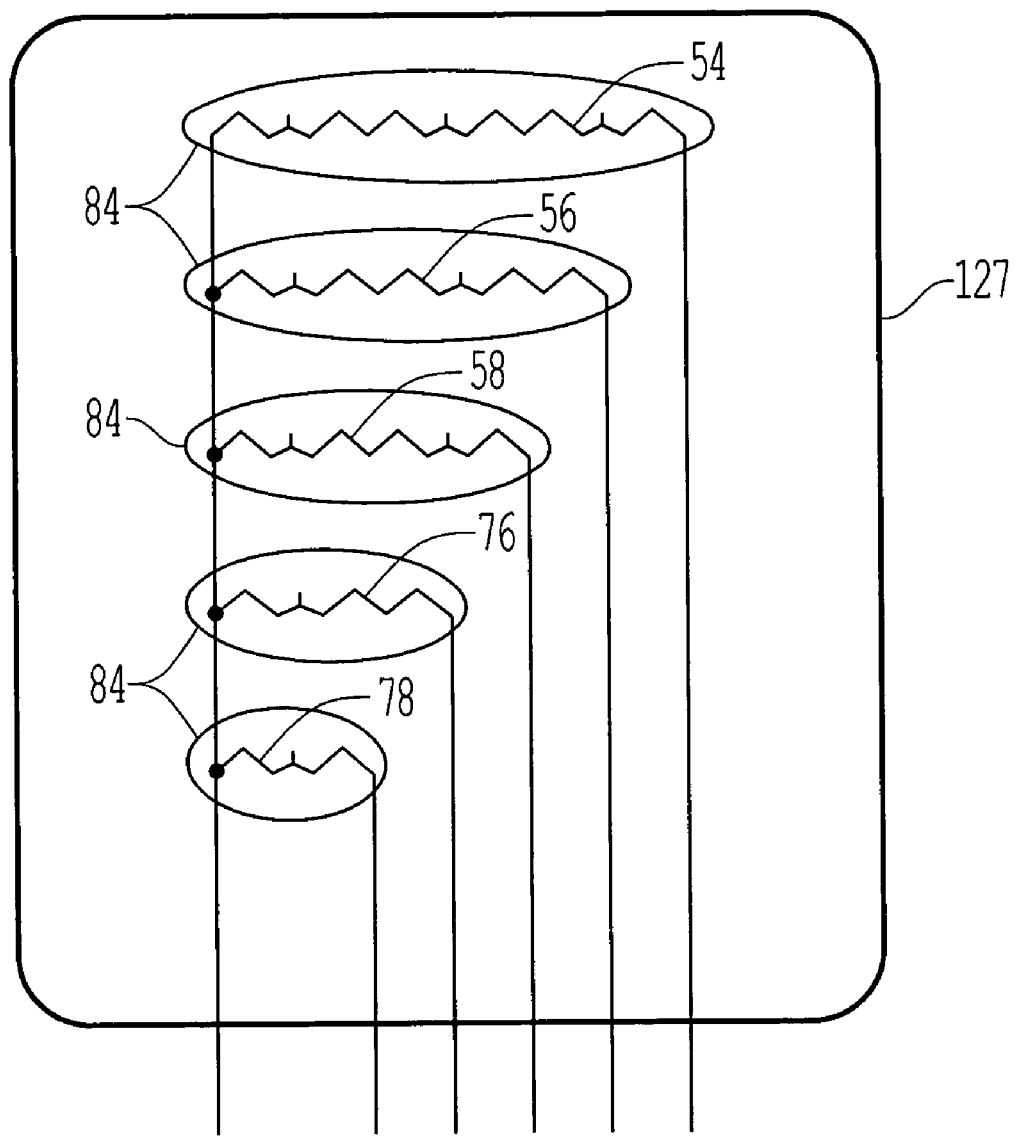
FIG. 3 is an alternative embodiment of the headlight filament section of FIGS. 2A and 2B.

Illumination Options 1–4 are applicable to all of the Figures except FIG. 3; Illumination Options 5–7 are applicable to all of the Figures except FIGS. 3, 2C and 2D; Illumination Options 8 and 9 are applicable to FIGS. 2E, 5A, 5B, 6A and 6B. NA means not applicable since the relay is not present or the headlights are off for the particular illumination option selected.

In the table above the third predetermined signal is transmitted to select red and blue flashing lights, red and clear flashing lights and blue and clear flashing lights since the output connections of the flasher module 74 determine which of these three options are applicable.

Some of the possible configurations of the predetermined signals, high and low beam selections and relays 40, 42, 68, 70 and 72 may not be legal in the United States. Any illegal configurations, such as using a high beam with a fog light, can be prevented by the use of control logic 80 in the receivers 30 and 31. The control logic 80 monitors the control signals received by the receivers 30 and 31 and the receivers shown in FIGS. 2E, 4A, 4B, 5A, 5B, 6A and 6B, and disables changes in the relays which would cause any illegal or unwanted configuration.

It will be appreciated that there are a wide variety of configurations when choosing how many filaments and which colors can be used for the various filaments. In addition, the number of flasher modules and the number of filaments that each flasher module is connected to also provide wide variations which can be made to the embodiments of FIGS. 2A, 2B, 2C, 2D, 2E, 4A, 4B, 5A, 5B, 6A and 6B all of which are within the scope of the present invention.

Figure 9B:
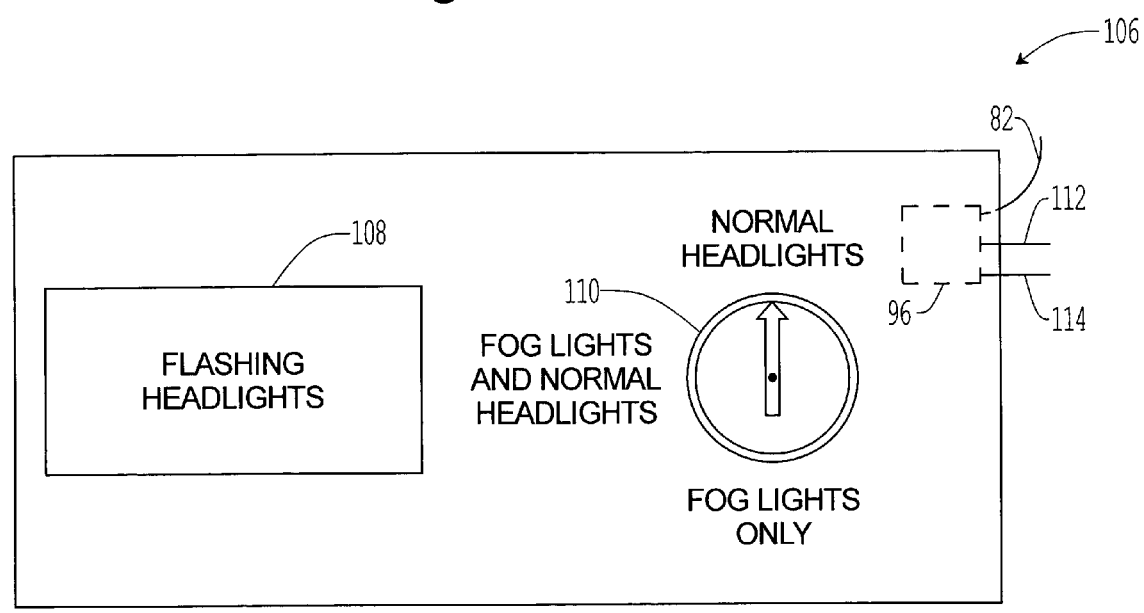
Figure 10:
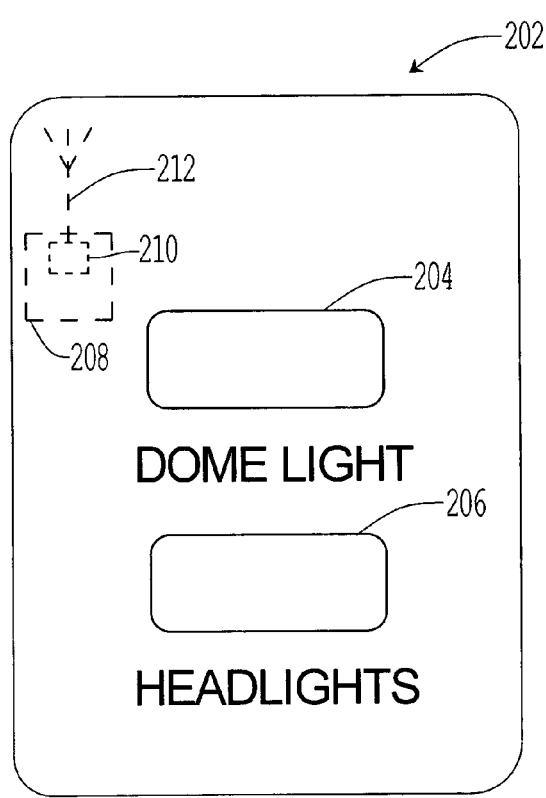
FIG. 10 is a top view of a portable remote control unit for the headlights of FIGS. 5A, 5B, 6A and 6B and the circuit shown in FIG. 8.
Figure 11:
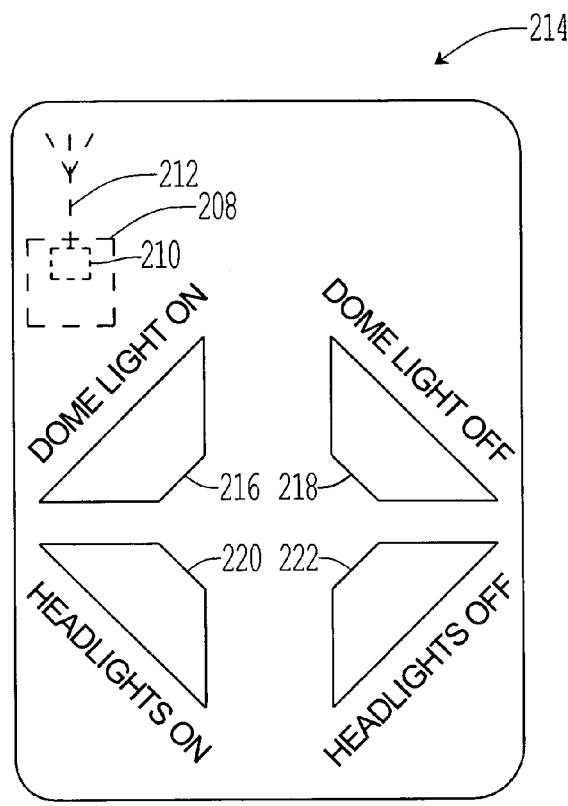
FIG. 11 is a top view of a second embodiment of a portable remote control unit for the headlights of FIGS. 5A, 5B, 6A and 6B and the circuit shown in FIG. 8.

Turning now to FIG. 2E, if the preferred embodiment of the present invention is installed by an automobile manufacturer, then only one of the headlight adapters, such as the headlight adapter 87 shown in FIG. 2B, would be needed for both headlights. FIG. 2E is a schematic diagram of two headlights, a left headlight 88 and a right headlight 90, each containing a filament section 28 and each filament section 28 connected to either a left headlight socket 92 or a right headlight socket 94. The left and right headlight sockets 92 and 94 are connected to a dashboard connector 96, which, in turn, is connected to a remote control unit 98, all generally designated as 100. A modified headlight adapter 102 is contained within the remote control unit 98 along with a decoder and transmitter circuit 104. An antenna 105, for receiving a transmission from the portable remote control shown in FIGS. 10 and 11, is connected the decoder and transmitter circuit 104. The remote control unit 98 is similar to the remote control unit 106 shown in FIG. 9B. The modified headlight adapter 102 is the same as headlight adapter 87 of FIG. 2B except that the receiver 31 is not present, but rather is contained within the decoder and transmitter circuit 104. The decoder and transmitter circuit 104 also has circuitry to decode the switch positions and pushbutton status of a switch 108 and a pushbutton 110 as shown in FIG. 9B.

In operation the decoder and transmitter electronics 104 receives battery voltage and chassis ground on lines 112 and 114, respectively. The decoder and transmitter electronics 104 decodes the switch 108 and pushbutton 110 status and generates the relay control signals through a cable 115 to the relays in the headlight adapter 102. The headlight adapter 102 receives the high beam voltage on line 118, the low beam voltage on line 120 and the common voltage for the headlights on line 122. The output signals from the headlight adapter 102 are connected to the dashboard connector 96 over lines 124. The dashboard connector passes the signals present on lines 124 to six nodes 125 where the signals are sent to both headlight connectors 92 and 94 which, in turn, pass the signals to the left and right headlight filament sections 28.

FIG. 3 is a schematic diagram of an alternative configuration of the headlight filament section 28 of FIG. 2A. In FIG. 3, in the headlight filament section 127, each of the filaments 54, 56, 58, 76 and 78 are in individual bulbs as indicated by the ovals 84. In this embodiment of the present invention a burned out filament can be replaced by replacing a single bulb thus enabling a relatively inexpensive repair of the headlight.

Figure 4A:
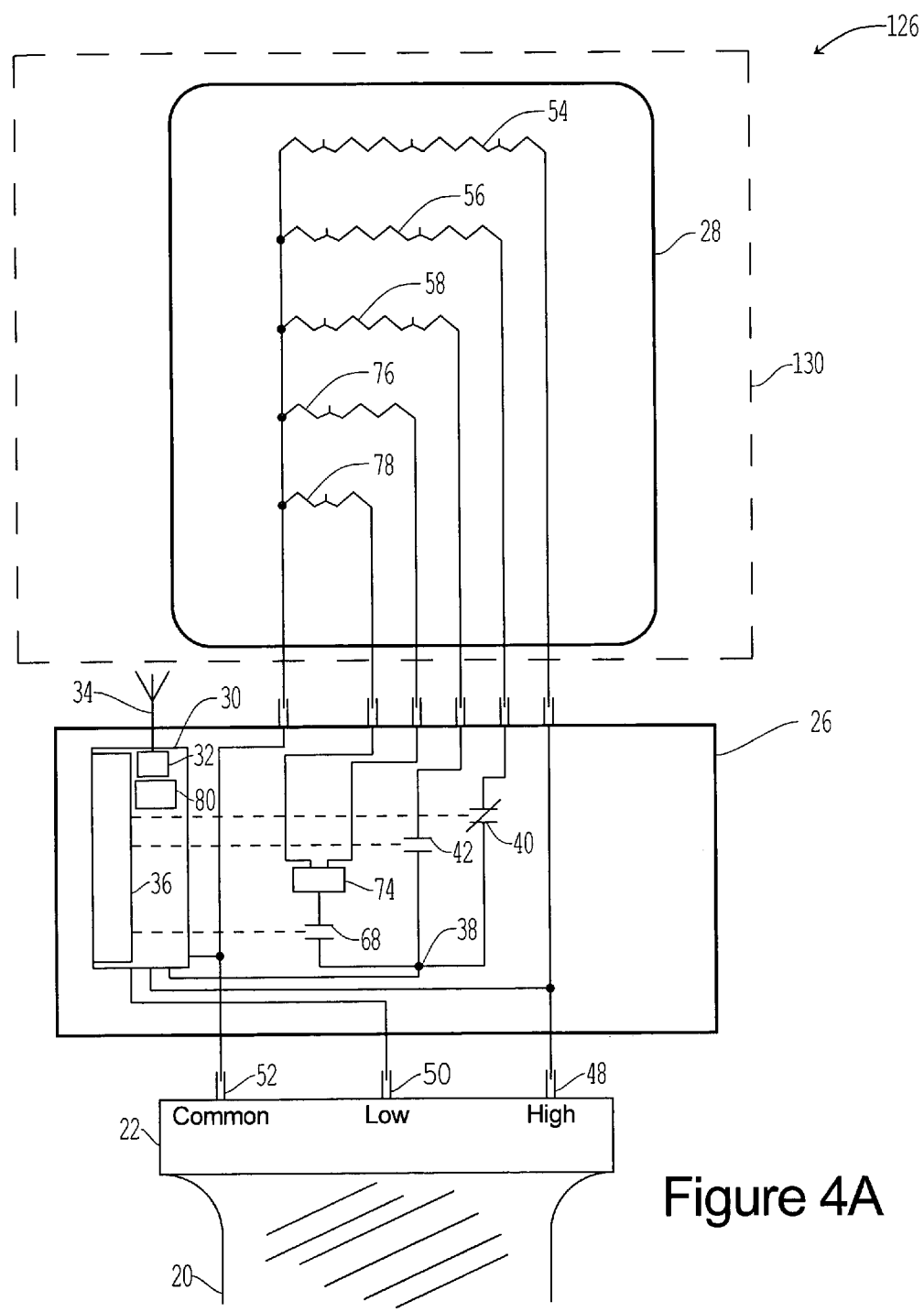
FIG. 4A is a schematic diagram of an alternative embodiment of the present invention which can be used in the vehicle of FIG. 1.

FIG. 4A is a schematic diagram, shown generally as 126, of another embodiment of the present invention together with a portion of the vehicle's electrical cable 20 and the vehicle's headlight socket 22. The embodiment of FIG. 4A differs from the embodiment of FIG. 2A in that the easily replaceable portion 130 of the headlight 126 is only the headlight filament section 28, with the headlight adapter 26 mounted solidly to the vehicle. The advantage to this embodiment is that the headlight filament section 28 can be replaced when one of the filaments 54, 56, 58, 76 and 78 burns out without changing the headlight adapter 26.

Figure 4B:
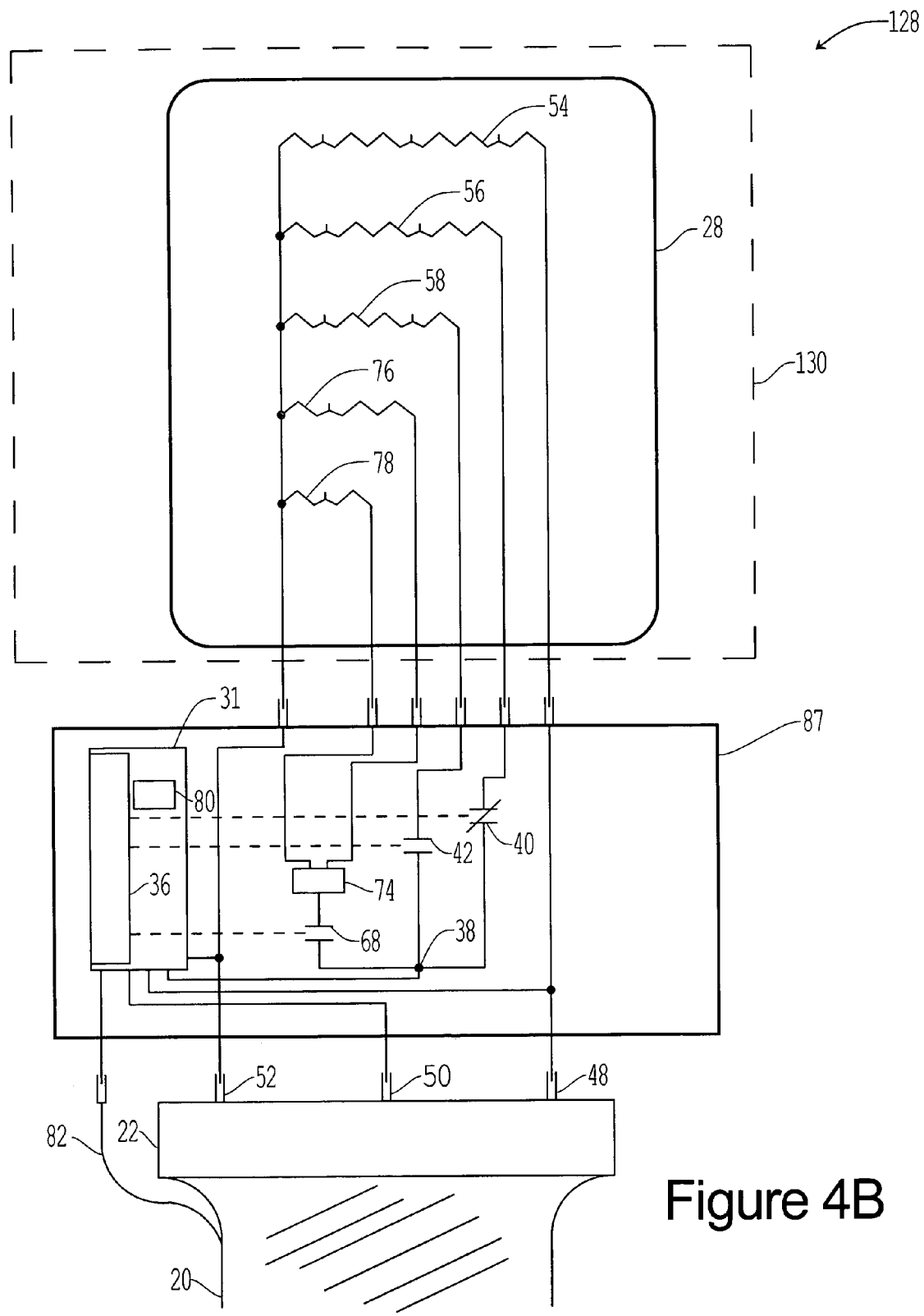
FIG. 4B is a schematic diagram of another alternative of the present invention which can be used in the vehicle of FIG. 1.

The headlight 128 of FIG. 4B, analogous to the headlight 86 of FIG. 2B, is the headlight 126 of FIG. 4A with the additional wire 82 added from the electrical cable 20 to the receiver 31 in headlight adapter 87 with the RF receiver 32 and antenna 34 removed.

Figure 5A:
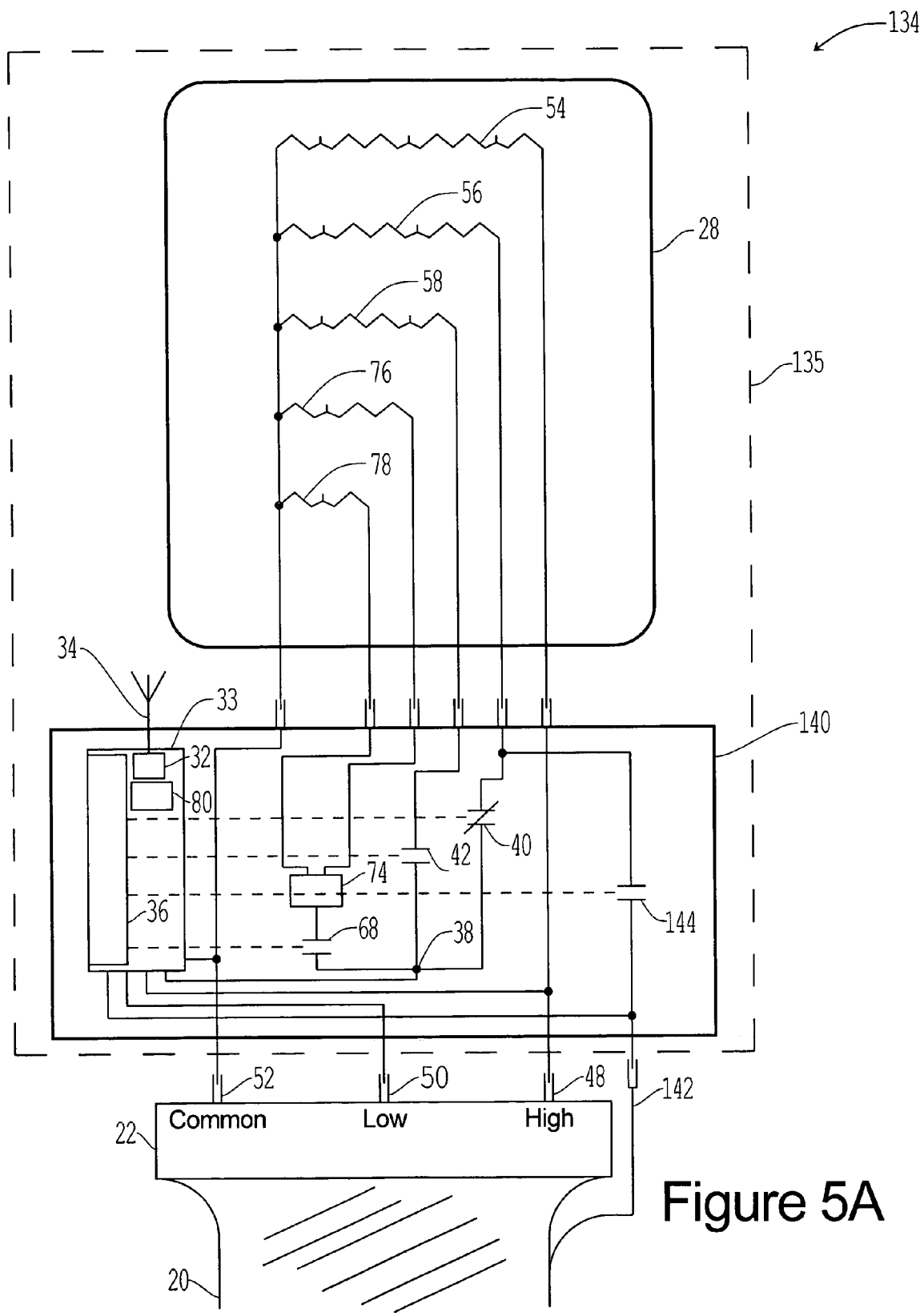
FIG. 5A is a schematic diagram showing another variation of a headlight which can be used in the vehicle of FIG. 1.

FIG. 5A is a schematic diagram, shown generally as 134, of another embodiment of the present invention together with a portion of the vehicle's electrical cable 20 and the vehicle's headlight socket 22. The headlight 134 of FIG. 5A is the headlight 16 of FIG. 2A except that the easily replaceable portion 135 of FIG. 5A contains a headlight adapter 140 modified by the addition of an extra wire 142 from the vehicle's electrical cable 20 which provides constant battery voltage, and by the addition of another relay 144. The battery voltage from wire 142 is routed to the receiver 33 and to a first contact of the relay 144, the other contact of relay 144 is connected to a point between relay 40 and filament 56.

Figure 5B:
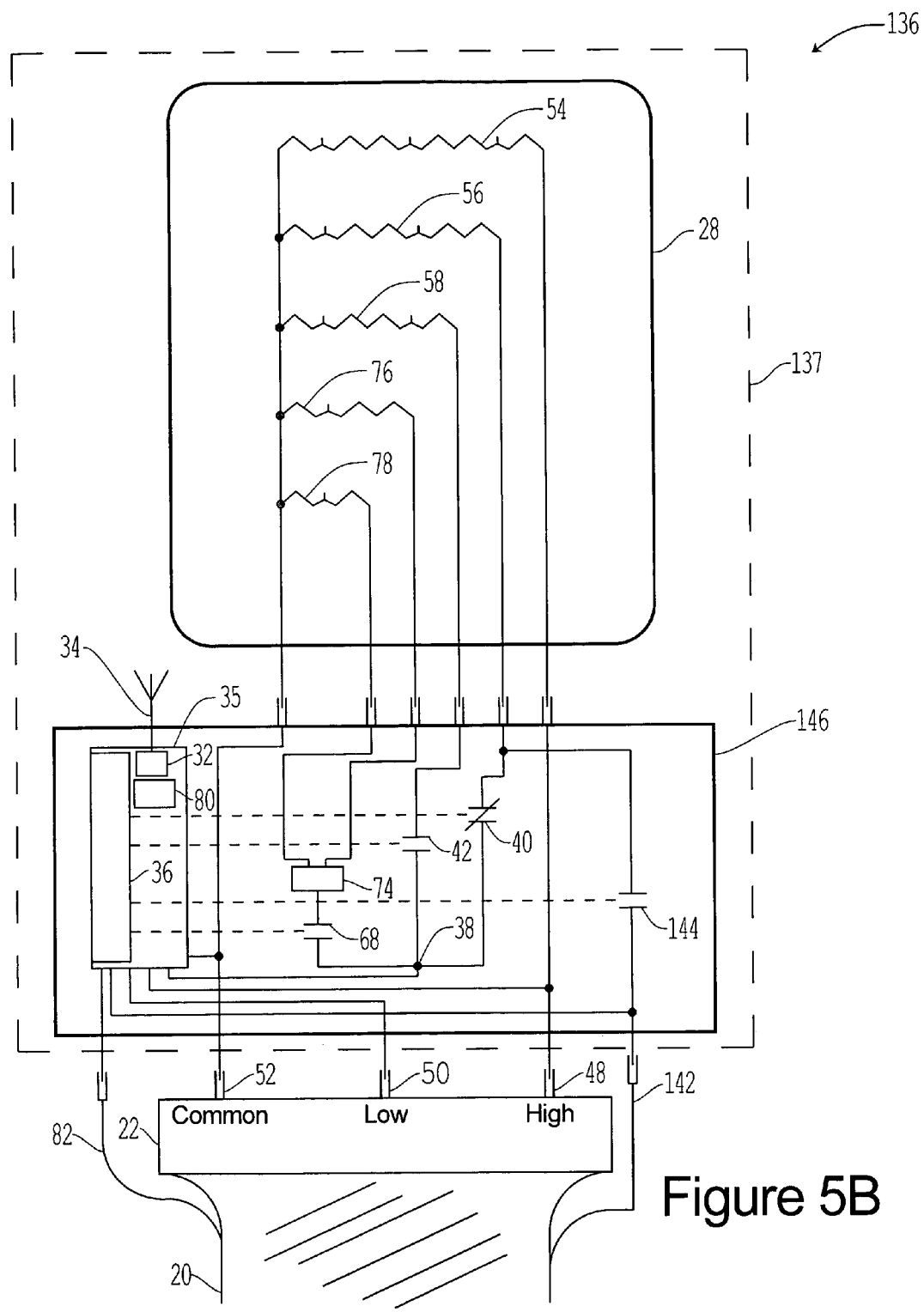
FIG. 5B is a schematic diagram showing still another variation of a headlight which can be used in the vehicle of FIG. 1.

FIG. 5B, which shows a headlight 136 analogous to headlight 86 of FIG. 2B, is the headlight 134 of FIG. 5A except that the easily replaceable portion 137 receives the additional wire 82 added from the electrical cable 20 to the receiver 35 in headlight adapter 146. The RF receiver 32 and the antenna 34 remain to receive signals from a portable remote control unit such as shown in either FIG. 10 or FIG. 11.

In operation the receivers 33 and 35 of FIGS. 5A and 5B, respectively, upon receiving a predetermined signal from a remote control unit such as shown in FIGS. 10 and 11, close relay 144 to illuminate filament 56, the low beam filament, whether the vehicle ignition switch is on or off and whether the normal headlight control switch is on or off. The battery voltage on wire 142 provides the constant power to the receiver 30.

Figure 6A:
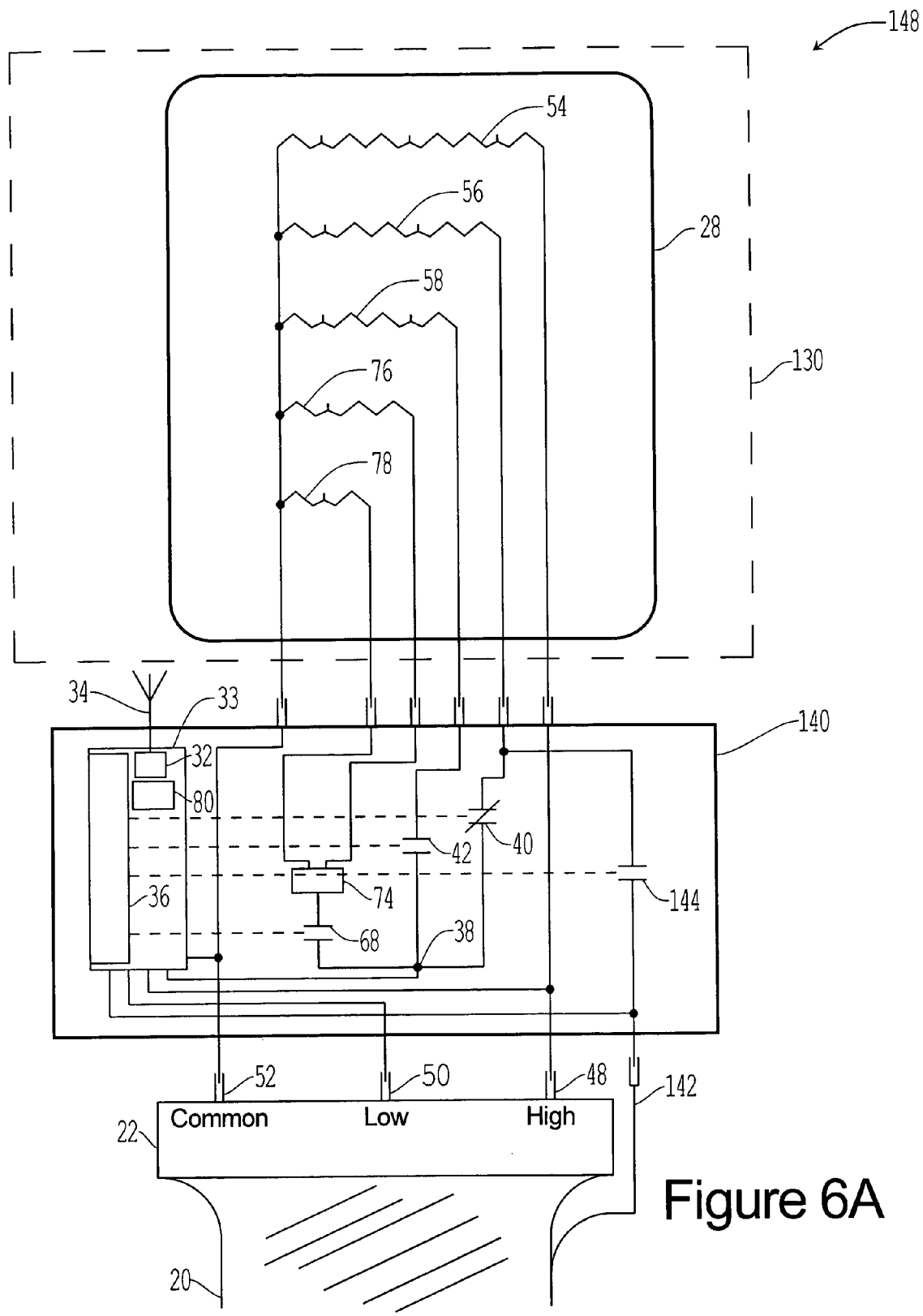
FIG. 6A is a schematic diagram showing still another alteration of a headlight which can be used in the vehicle of FIG. 1.

FIG. 6A is a schematic diagram, shown generally as 148, of still another embodiment of the present invention together with a portion of the vehicle's electrical cable 20 and the vehicle's headlight socket 22. FIG. 6A combines the headlight adapter 140 of FIG. 5A with the easily replaceable portion 130 of FIGS. 4A and 4B.

Figure 6B:
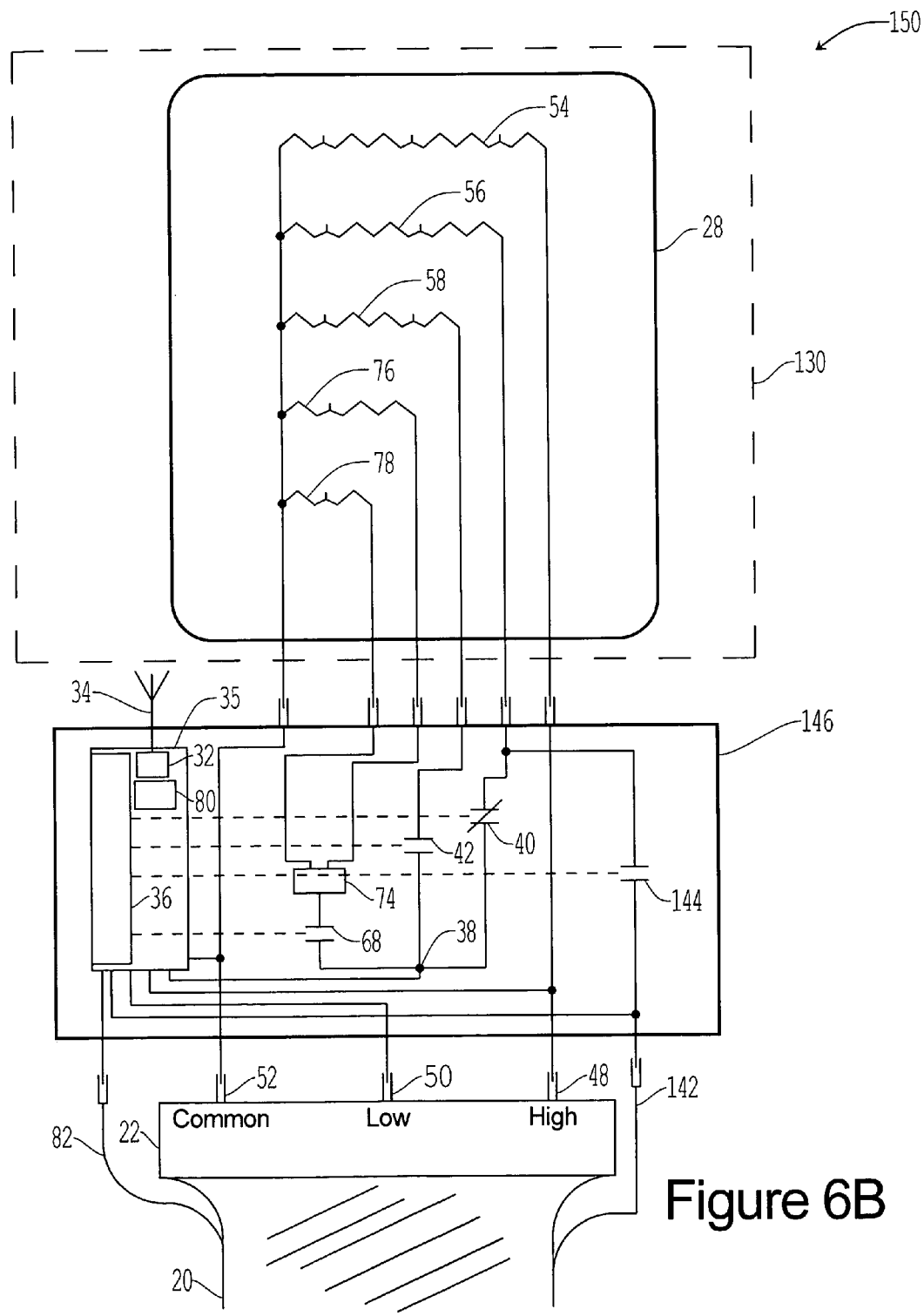
FIG. 6B is a schematic diagram showing another additional variation of a headlight which can be used in the vehicle of FIG. 1.

FIG. 6B, which shows a headlight 150 analogous to headlight 136 of FIG. 5B, is the headlight 148 of FIG. 6A with the additional wire 82 added from the electrical cable 20 to the receiver 35 in headlight adapter 146.

Figures 7, 8:
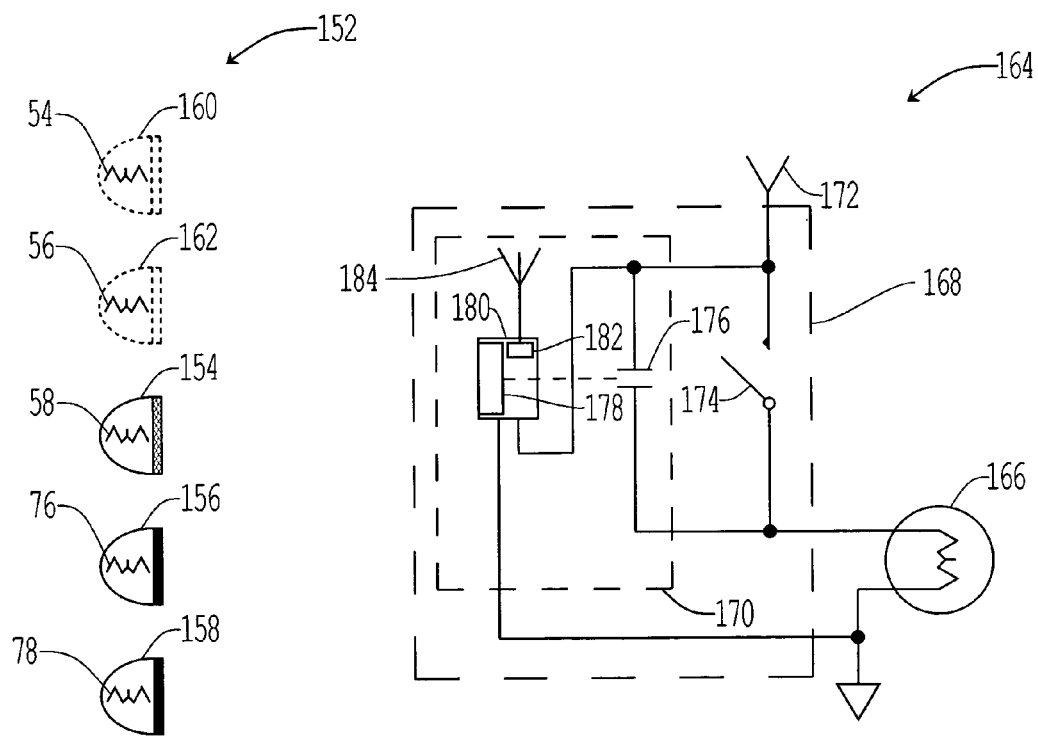
FIG. 7 is a side view layout of the filaments of the headlights of FIGS. 2A, 2B, 3, 4A, 4B, 5A, 5B, 6A and 6B.
FIG. 8 is a schematic diagram of the interior light of FIG. 1 and the switches for controlling the interior light.

FIG. 7 is a side view of a layout of the filaments 54, 56, 58, 76 and 78, generally shown as 152. Filaments 58, 76 and 78 are surrounded by enclosures 154, 156 and 158, respectively, each with a colored front portion. Enclosure 154 has a yellow or fog light colored front portion, enclosure 156 has a red colored front portion and enclosure 158 has a blue colored front portion. Also, the enclosures 154, 156 and 158 may not be hermetically sealed, or may be hermetically sealed in which case filaments 54 and 56 would advantageously also have hermetically sealed enclosures 160 and 162, respectively, with clear fronts so that only the enclosures need be oxygen free, allowing relatively easy replacement of individual filaments or of the filaments together with their enclosures.

FIG. 8 is a schematic diagram, shown generally as 164, of an interior light bulb 166 of the dome light 14 and the switching circuitry 168 for controlling the on and off state of the bulb 166. The switching circuitry 168 includes an interior lighting adapter 170. The battery voltage is received at input terminal 172 and coupled through a conventional interior light on-off switch 174 to one end of the filament in the bulb 166, the other end of the filament being connected to chassis ground. Placed in parallel with the switch 174 is a normally open relay 176. The relay 176 is controlled by a relay controller 178 located inside the receiver 180. The receiver 180 also contains a RF receiver 182 that is connected to an antenna 184.

In operation, when the relay 176 is open, the switch 174 controls the on and off operation of the bulb 166. When a predetermined signal is received by the antenna 184 and passed to the receiver 180, relay 176 is closed, and switch 174 does not then control the bulb 166. Thus the bulb 166 can be turned on (if not already turned on by the switch 174) by the transmission of the predetermined signal when it is received by the antenna 184. In the preferred embodiment of the invention the bulb 166 is turned off when a second predetermined signal is received by the antenna 184 (provided that switch 174 is open).

Figure 9A:
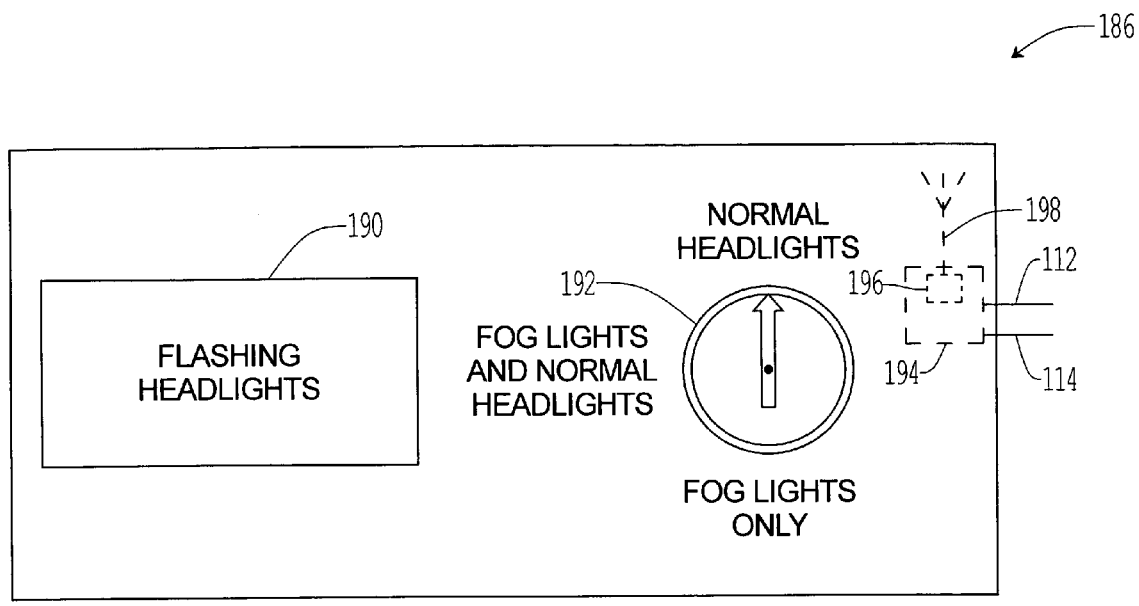
FIGS. 9A and 9B are side views of a remote control unit for the headlights of FIGS. 2A, 2B, 3, 4A, 4B, 5A, 5B, 6A and 6B which are mounted inside the vehicle.

FIG. 9A is a side view of a remote control unit, generally shown as 186, for the headlights of FIGS. 2A, 2C, 2D, 2E, 4A, 5A and 6A. The remote control unit 186 is mounted inside the vehicle using screws or Velcro® or any other appropriate attachment device. The remote control unit 186 includes, in the preferred embodiment of the invention, a push-on push-off switch 190, and a three position rotary switch 192. The push button switch 190 is used to enable or disable the flashing headlights, and the rotary switch is used to select the normal headlights, the fog lights only or the fog lights with the low beam headlights. A transmitter 194 containing a RF transmitter 196 having an antenna 198 attached thereto are located within the remote control unit 186 for transmitting the appropriate predetermined signals, depending on the status of the switches 190 and 192, to the antennas of the headlight adapters of FIGS. 2A, 2C, 2D, 2E, 4A, 5A and 6A.

FIG. 9B shows a remote control unit 106 that is the remote control unit 186 of FIG. 9A with the additional wire 82 from the transmitter 96 which may be routed through the electrical cable 20 to the headlights of FIGS. 2B, 4B, 5B and 6B. The RF transmitter 196 and antenna 198 of FIG. 9A are not needed in FIG. 9B.

FIG. 10 is a top view of a portable remote control unit, generally shown as 202, for illuminating, in the preferred embodiment of the invention, the low beam filaments 56 of headlights 126, 128, 134, and 136 of FIGS. 2B, 4B, 5B and 6B, respectively, and the interior light bulb 166 of FIG. 8. The remote control unit 202 can be removed from the vehicle like present day remote door lock controllers. In fact, the remote control unit 202 could be incorporated into the original manufacture's remote controller. The remote control unit 202 has a push-on, push-off switch 204 and a push-on, push-off switch 206, in the presently preferred embodiment of the present invention, for turning on the interior light bulb 166 and for turning on the low beam filaments 56 of the headlights 126, 128, 134, and 136. In an alternate embodiment switches 204 and 206 would be momentary push button switches, and the receiver 33 of FIGS. 5A and 6A, receiver 35 of FIGS. 5B and 6B and receiver 180 of FIG. 8 would have built in timers to turn off the interior light bulb 166 of FIG. 8 (if switch 174 is open), and turn off the low beam of FIGS. 5A, 5B, 6A and 6B (if relay 40 is open or the headlight switch in the vehicle is off). Alternatively, the remote controller unit 202 could have a built-in timer that would send a turn off predetermined signal at the end of the time period of the timer. The control unit 202 also contains a transmitter 208 that contains a RF transmitter 210 with an antenna 212 attached thereto for transmitting the appropriate predetermined signals, depending on the status of the switches 204 and 206.

FIG. 11 is a top view of an alternative embodiment of a portable remote control unit 202 of FIG. 10, generally shown as 214. The remote control unit 214 is the same as the remote control unit 202 of FIG. 10 except for the type of switches used. The portable remote control unit 214 has four momentary push button switches 216, 218, 220 and 222. These switches are coupled to the transmitter 208. These switches are used to enable turning on and turning off the interior light bulb 166 of FIG. 8 (if switch 174 is open), and turning on and turning off the low beam of FIGS. 5A, 5B, 6A and 6B (if relay 40 is open or the headlight switch in the vehicle is off).

The circuitry shown in FIG. 8 and the remote control units shown in FIGS. 10 and 11 provide additional security for a driver approaching his or her vehicle by turning on an interior light, such as a dome light, before reaching the vehicle. The driver can then see if someone is in the vehicle without disturbing other people in the area and bringing attention to himself or herself. Also the circuitry of FIGS. 5A, 5B, 6A and 6B allows a driver approaching or leaving a vehicle to turn on the low beam headlight to provide additional light to and from the vehicle.

Although the invention has been described in part by making detailed reference to a certain specific embodiment, such detail is intended to be, and will be understood to be, instructional rather than restrictive. It will be appreciated by those skilled in the art that many variations may be made on the structure and mode of operation without departing from the spirit and scope of the invention as disclosed in the teachings contained herein.

I claim:

1. A lighting control system for a vehicle comprising:
  a) a headlight having a headlight filament section containing a first filament;
  b) a headlight adapter coupled to said headlight filament section and having a first connector configured to connect to a second connector attached to a wiring harness in a vehicle, said headlight adapter having a first current enabling device coupled between said headlight filament section and said second connector such that enabling of said first current enabling device illuminates said first filament when a voltage within a predetermined voltage range is applied to a first receiver in said headlight adapter;
  d) said first receiver coupled to said first current enabling device for receiving a first control signal and enabling said first current enabling device upon receipt thereof;
  e) a first transmitter for transmitting said first control signal;
  f) a means for connecting a wire connected to said headlight adapter and to said first receiver to a constant battery voltage; and
  g) a second current enabling device coupled between said wire and a second filament in said headlight filament section for illuminating said second filament in response to a second control signal transmitted by a second transmitter and received by said first receiver.

2. The lighting control system, according to claim 1, further including an interior light in a vehicle and an interior lighting adapter coupled to a second current enabling device connected in parallel with an on-off switch of said interior light, said interior light becoming illuminated in response to a second control signal transmitted from a second transmitter and received by said interior lighting adapter.

3. The lighting control system, according to claim 2, wherein said interior lighting adapter includes a second receiver for receiving said second control signal and enabling said second current enabling device in response thereto.

4. The lighting control system, according to claim 1, wherein said first current enabling device includes a relay.

5. The lighting control system, according to claim 1, wherein said first receiver and said first transmitter communicate using a wired connection.

6. The lighting control system, according to claim 1, wherein said first filament and said second filament are the same filament.

7. The lighting control system, according to claim 1, further including a flasher module coupled between said current enabling device and said first filament whereby when said first current enabling device is enabled said first filament flashes on and off.

8. The lighting control system, according to claim 1, wherein said first receiver and said first transmitter communicate using a wireless connection.

9. A lighting control means comprising:
  a) a headlight having a headlight filament section containing a first filament;
  b) a headlight adapter means coupled to said headlight filament section and having a first connector configured to connect to a second connector attached to a wiring harness in a vehicle, said headlight adapter means having a first current enabling means coupled between said headlight filament section and said second connector such that enabling of said current enabling means illuminates said first filament of said headlight filament section when a voltage within a predetermined voltage range is present at a first receiver;
  d) said first receiver coupled to said current enabling means for receiving a first control signal and enabling said first current enabling means upon receipt thereof;
  e) a first transmitter for transmitting said first control signal; and
  f) an interior lighting means in a vehicle and an interior lighting adapter means coupled to a second current enabling means connected in parallel with an on-off switch means of said interior light, said interior lighting means becoming illuminated in response to a second control signal transmitted from a second transmitter and received by a second receiver in said interior lighting adapter which enables said second current enabling device.

10. A lighting control system for a vehicle comprising:
  a) a wiring harness mounted in a vehicle;
  b) a headlight having a first connector adapted to connect to a second connector mounted on said wiring harness;
  c) a headlight adapter mounted inside said headlight and connected to said first connector and to a first filament in said headlight;
  e) a first receiver attached to said headlight adapter for receiving a first control signal, said first receiver coupled to and controlling a current enabling device in said headlight adapter, said current enabling device coupled between said second connector and said first filament;
  f) a transmitter for transmitting said first control signal for enabling said first filament in said headlight in response to said first control signal;
  g) a means for connecting a wire connected to said headlight adapter and to said first receiver to a constant battery voltage; and
  h) a second current enabling device coupled between said wire and a second filament in said headlight filament section for illuminating said second filament in response to a second control signal transmitted by a second transmitter and received by said first receiver.

11. The lighting control system, according to claim 10, further including an interior light in a vehicle and an interior lighting adapter coupled to a second current enabling device connected in parallel with an on-off switch of said interior light, said interior light becoming illuminated in response to a second control signal transmitted from a second transmitter and received by a second receiver in said interior lighting adapter which enables said second current enabling device.

12. A method for controlling a Lighting system for a vehicle comprising the steps of:
  a) transmitting from a first transmitter a first control signal;

b) receiving said first control signal at a first receiver in a headlight adapter, said headlight adapter coupled between a wiring harness of said vehicle and a first filament of a headlight of said vehicle;

c) one of completing and interrupting a connection in said headlight adapter between said first filament and said wiring harness to thereby perform one of turning on and turning off, respectively, said first filament in said headlight; and d) enabling a current control device coupled between a source of constant battery voltage and a second filament in said headlight filament section for illuminating said second filament in response to a second control signal transmitted by a second transmitter and received by said first receiver.

13. The method for controlling a lighting system for a vehicle, according to claim 12, further including the steps of:

a) transmitting from a second transmitter a second control signal;

b) receiving said second control signal at a second receiver in a interior lighting adapter, said interior lighting adapter coupled to a second current enabling device connected in parallel with an on-off switch of an interior light; and c) illuminating said interior light in response to a second of said control signals transmitted from a second transmitter and received by said interior lighting adapter.

14. The method for controlling a lighting system for a vehicle, according to claim 12, wherein step a) includes moving a mechanical switch on a portable transmitter such that said first control signal is transmitted.

* * * * *